United States Patent [19]

Leiby, Jr. et al.

[11] 4,323,860
[45] Apr. 6, 1982

[54] LASER EXCITED MOLECULAR BEAM TIME AND FREQUENCY STANDARD

[75] Inventors: Clare C. Leiby, Jr., Bedford; Shaoul Ezekiel, Lexington, both of Mass.

[73] Assignee: The United States of America as represented by the Secretary of the Air Force, Washington, D.C.

[21] Appl. No.: 134,358

[22] Filed: Mar. 27, 1980

[51] Int. Cl.$^3$ .............................................. H01S 3/13
[52] U.S. Cl. .................................................... 372/32
[58] Field of Search ....................... 331/94.5 S, 94.5 G

[56] References Cited

U.S. PATENT DOCUMENTS

| | | | |
|---|---|---|---|
| 3,686,585 | 8/1972 | Javan et al. ..................... | 331/94.5 S |
| 3,755,678 | 8/1973 | Javan ................................ | 250/211 J |
| 4,121,178 | 10/1978 | Schlossberg ................... | 331/94.5 G |

OTHER PUBLICATIONS

Grove et al., Measurement of the Spectrum of Resonance Fluorescence from a Two-Level-Atom in an Intense Monochromatic Field, Phys. Rev. A, V15, N1 (Jan. 1977).
Hellwig, Atomic Frequency Standards: A Survey, Proc. IEEE, vol. 63, No. 2, (Feb. 1975), pp. 212-228.
Picque, Hyperfine Optical Pumping of a Cesium Atomic Beam and Applications, Metrologia, 13, 1977, pp. 115-119.
Leiby et al., Molecular Beams and Effusive Flows, Am. J. Phys., vol. 47, No. 9, (Sep. 1979), pp. 791-796.
Ramsey, Molecular Beams, Oxford Press, London, 1956, Ch. 14.
Tamir, T., Ed., Topics in Applied Physics, Integrated Optics, vol. 7, Springer-Verlag, New York, 1975, Ch. 4.

Primary Examiner—William L. Sikes
Attorney, Agent, or Firm—Donald J. Singer; Jacob N. Erlich

[57] ABSTRACT

A laser excited molecular beam time and frequency standard utilizing a first electromagnetic beam at a first preselected frequency to excite a molecular beam at a first preselected point along the beam in order to produce fluorescence. A second electromagnetic beam (produced from either a different electromagnetic source than utilized to produce the first beam or produced from a portion of the first beam) at a second preselected frequency excites the molecular beam at a second preselected point along the beam to produce fluorescence. By locking the frequency of the first and second electromagnetic beams to specific resonant frequencies, a time and frequency standard can be produced.

10 Claims, 3 Drawing Figures

LASER EXCITED MOLECULAR BEAM TIME AND FREQUENCY STANDARD

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a device for producing a time and frequency standard, and, more particularly, to a simplified, small, rugged and relatively inexpensive laser excited molecular beam time and frequency standard.

Most clocks, and in particular, clocks which are extremely accurate and precise are based, in their operation on frequency standards. For periodic events, the time between the events, t, is related to the frequency, $\nu$, of their occurrence by the simple equation $\nu = 1/t$. Periodic events can be used to define time, i.e., the generator of the periodic events—the frequency standard—can be used as a clock. The frequency standard becomes a clock by the addition of a counting mechanism for the events.

The first clocks based on a frequency standard (a pendulum) were invented about 400 years ago. This type of clock is still most widely used today. The pendulum may be a suspended weight (gravitational pendulum) like in "grandfather" clocks or the balance (torsion pendulum) of modern wristwatches. The instant invention deals with today's most advanced frequency standards and clocks; however, a close look at traditional clocks show all the essential features which are utilized in quartz crystal and atomic clocks.

The unit of time today is the second (symbol s). The second is defined in reference to a frequency determining element. Since 1967 by international agreement this "natural pendulum" is the cesium atom. One second is defined in the official wording as "the duration of 9 192 631 770 periods of the radiation corresponding to the transition between the two hyperfine levels of the ground state of the cesium-133 atom." Accordingly, the frequency of the cesium pendulum is 9 192 631 770 events per second (the cesium atom is a very rapidly oscillating pendulum). The unit of frequency is then defined as hertz (symbol Hz) which means the repetitive occurrence of one event per second (the use of "hertz" is preferred to the older term "cycle per second", cps).

Many kinds of frequency determining elements have been and are being used in frequency standards. They can be grouped into three classes: mechanical resonators, electronic resonators, and atomic resonators.

As far as mechanical resonators are concerned most accurate clocks deal only with the quartz crystals. Other mechanical resonators like the pendulum and the tuning fork are of no importance in today's high performance frequency standards, although they have been historically very important and are still widely used in low performance devices (e.g. in watches). For similar reasons electronic resonators like tank circuits are unable to provide an adequate frequency standard for high precision clocks. Atomic resonators form the heart of our most accurate frequency standards and clocks.

It has recently been proposed (see Picque', Jean-Louis, "Hyperfine Optical Pumping of a Cesium Atomic Beam, and Applications," Metrologia, 13, 1977, pps 115–119) that laser atomic-molecular state selection be employed in time and frequency standards. In the case of atomic/molecular beam devices such as current cesium standards, laser state selection and state detection replaces magnetic state-selection and hot wire state detection. Consequently, atomic number densities in the interaction region can be increased by many orders of magnitude (i.e., $10^4$ to $10^6$) over those obtained in devices employing magnetic state selection. This translates into a corresponding increase in signal-to-noise ratio. Signal-to-noise, together with the greatly reduced response time of the laser state detection system, leads to greatly improved short term stability for the device.

Unfortunately, such devices are restricted to the use of atoms whose hyperfine transitions lie in a rather limited range of microwave frequencies. This is so because the microwave cavities employed in such devices must fit inside reasonably dimensioned vacuum chambers, and yet be large enough that the atomic (molecular) beam constitute only a small perturbation to the empty cavity Q, where Q is the ratio of energy stored in the cavity to energy input to the cavity per cycle.

Consequently, there arises a need for a small, lightweight, rugged, simply constructed and inexpensive high performance clock which eliminates the problems associated with such devices of the past.

SUMMARY OF THE INVENTION

The instant invention overcomes the problems set forth hereinabove by providing a laser excited molecular beam time and frequency standard which eliminates the use of a microwave cavity as well as state selection (preparation and post-detection) magnets and hot wire detectors, and is therefore simplified in its construction as well as being small, lightweight, rugged, an inexpensive to produce.

The laser excited frequency standard of this invention utilizes a conventional molecular or atomic beam source, such as a beam oven for producing molecules or atoms which are formed into a beam by collimating slits.

It should be noted that since the term molecule encompasses particles such as atoms, the terms molecule and molecular beam will be utilized hereinafter throughout the specification in order to provide a more comprehensive description of this invention.

A first laser beam at a preselected frequency intercepts the molecular beam and excites the beam molecules from an initial ground state to an intermediate state. Since the radial velocities of the molecules in the highly collimated beam are negligibly small, this geometry guarantees that the optical transition will be essentially Doppler-free.

From the intermediate state the molecules spontaneously decay to both the initial ground state and the final ground state. The fluorescence associated with this process is detected and fed into a servo loop which locks the frequency of the laser to the resonant frequency corresponding to the transition between the initial state and the intermediate state.

Thereafter, a second laser beam at a different frequency than the preselected frequency of the first laser beam intersects the molecular beam farther down the beam. The second laser beam may emanate from another laser source or it may be a portion of the original laser beam which has been frequency shifted. An advantage of frequency shifting the same laser beam is that any frequency jitter associated with the laser source can be cancelled by an appropriate conventional subtraction procedure since both beams emanate from the same laser.

One method of frequency shifting the laser beam is by means of a conventional acousto-optical modulator. The acousto-optical modulator acts as a moving thick grating driven by an external acoustic power source; consequently, the frequency shifted light beam emerges at the Bragg angle with the frequency shift being equal to the acoustic frequency. The fraction of the incident light that is frequency shifted does so in accordance with the input power of the acoustic driving source.

The laser beam at the different frequency (wavelength) is utilized to intercept the molecular beam in order to excite the molecules of the molecular beam from the final state to the intermediate state from whence they spontaneously decay to both the initial and final ground states.

In the case of two independent laser beam sources being utilized with this invention, the fluorescense associated with the spontaneous decay is detected and utilized to lock the frequency of the second laser source to the resonant frequency corresponding to a transition between the final state and the intermediate state. The frequency difference between the locked first laser source and the second laser source is detected and acts as the time and frequency (clock) signal. This time and frequency signal can also be utilized to stabilize a high precision clock in a conventional manner.

With a single laser source utilized with this invention in the manner set forth above, the fluorescence associated with this spontaneous decay is detected and utilized to lock the frequency of, for example, a microwave source driving the acousto-optical modulator to the resonant frequency corresponding to a transition between the final state and the initial state. This locked frequency is at the frequency which can be readily utilized as the time and frequency standard and is output from the device of this invention.

Although the frequency standard of this invention has the advantages of greater simplicity over prior devices, it tends to suffer in one respect, that is, the device is locked to a linewidth of an intermediate state which can be much broader than the linewidth of the initial and final states depending on the selected molecule. However, the relatively broad linewidth of intermediate state associated with this invention is compensated for by the potential of achieving greatly improved signal-to-noise ratio. To be more precise, the frequency stability of an atomic clock is proportional to the ratio of its associated linewidth to its signal-to-noise ratio. With respect to present time and frequency standards, the instant invention might well equal or exceed present short and long term stabilities.

It is therefore an object of this invention to provide a time and frequency standard which eliminates the use of a microwave cavity as well as state selection magnets and hot wire detectors within the device.

It is another object of this invention to provide a time and frequency standard with greatly improved signal-to-noise ratio.

It is still another object of this invention to provide a time and frequency standard which is substantially more compact than time and frequency standards of the past.

It is still a further object of this invention to provide a time and frequency standard in which maintaining the alignment of the molecular beam is greatly simplified.

It is still another object of this invention to provide a time and frequency standard which is economical to produce and which utilizes conventional, currently available components in its manufacture.

For a better understanding of the present invention, together with other and further objects thereof, reference is made to the following description taken in conjunction with the accompanying drawing and its scope will be pointed out in the appended claims.

DETAILED DESCRIPTION OF THE PREFERRED EMBODIMENT

Figure 1:
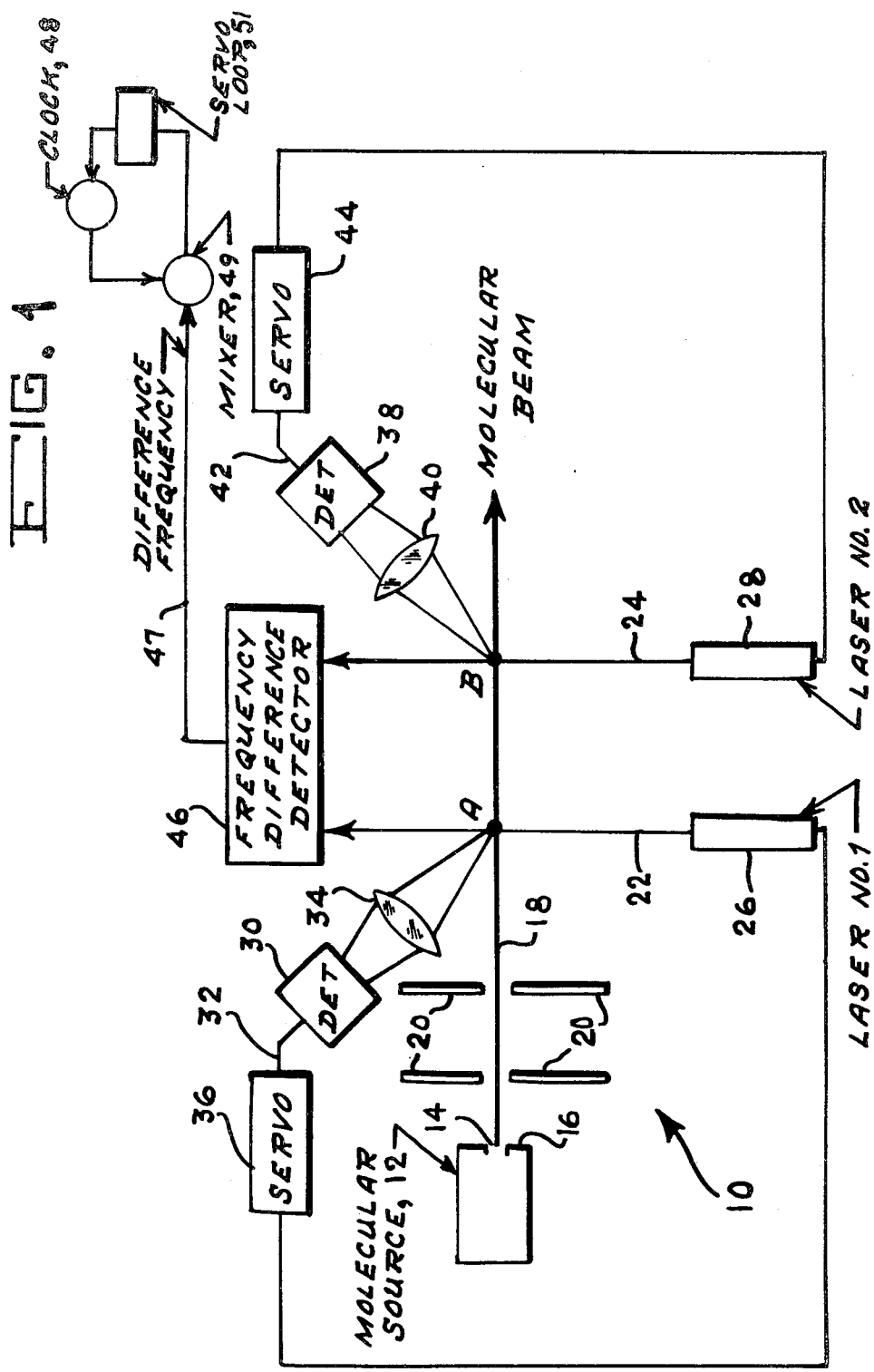
FIG. 1 is a schematic representation of the laser excited molecular beam time and frequency standard of this invention.

Reference is now made to FIG. 1 of the drawing which schematically illustrates the laser excited molecular beam time and frequency standard 10 of this invention. The laser excited frequency standard 10 of this invention utilizes a conventional molecular beam source 12 such as a beam oven of the type described in the publication by Leiby et al entitled "Molecular Beams and Effusive Flows" in *American Journal of Physics*, Vol. 47, No. 9, September 1979, pages 791 through 796 or in a book by N. F. Ramsey entitled "Molecular Beams," Oxford Press, London, 1956, Chapter 14. Molecules emanating from an aperture 14 in the wall 16 of beam oven 12 are formed into a molecular beam 18 by means of conventional collimating slits 20.

Intercepting molecular beam 18 are a first and a second coherent beam of electromagnetic radiation 22 and 24, respectively, in a manner set forth in detail hereinbelow. Coherent electromagnetic beams 22 and 24 emanate from a pair of suitable electromagnetic radiation sources such as conventional compact semi-conductor lasers 26 and 28, respectively.

Reference is now made specifically to beam 22 which intersects molecular beam 18 at region A. As shown, for example, in the three level molecular system of FIG. 3 of the drawing, there are equal numbers of molecules in the initial ground state 1 and final ground state 3. It should, however, be realized that this invention is not limited to the particular three level system shown in FIG. 3, but for purposes of ease of understanding of this invention, the following description will refer thereto. If, for example, there are initially few or no thermally excited molecules in the final state 3 (as would be the case for molecular clocks operating at the millimeter or submillimeter frequencies) beam 22 at region A would also serve as a means for optically pumping a portion of the molecules from the initial state 1 to the final state 3 for excitation in region B.

Figure 3:
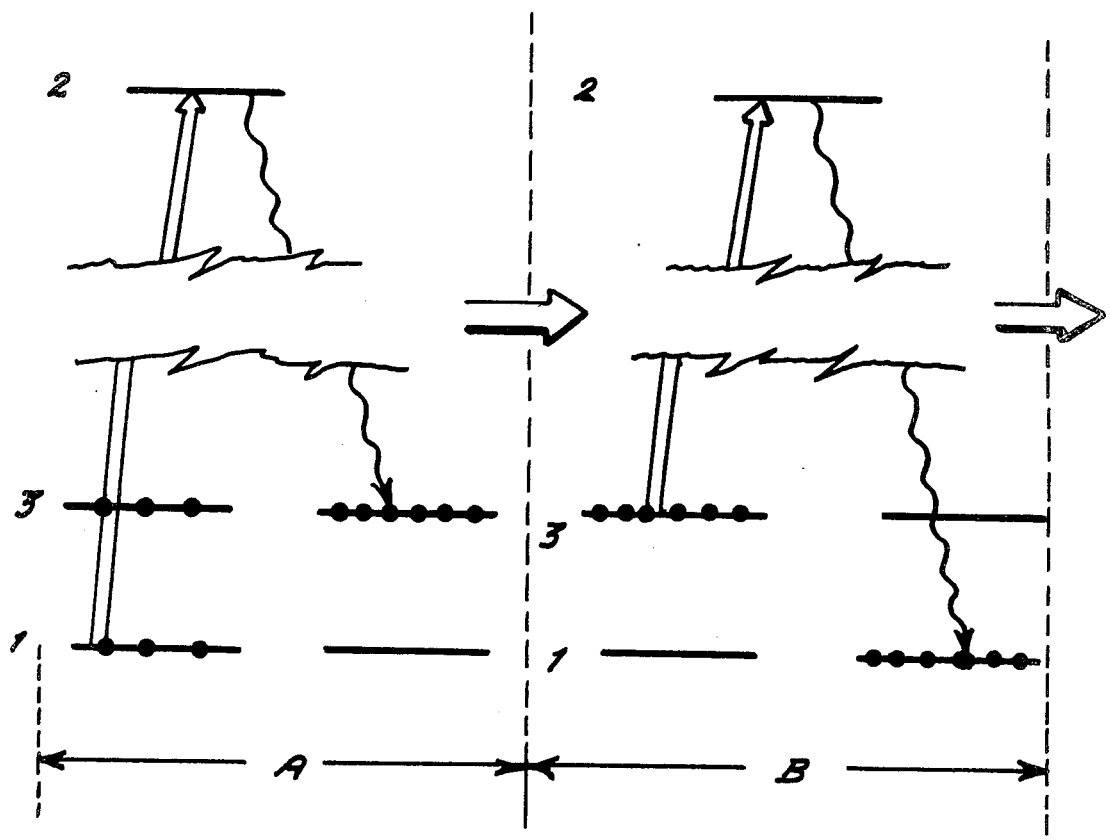
FIG. 3 is a schematic representation of a three level molecular system utilized with the time and frequency standard of this invention.

In region A (as shown in FIGS. 1 and 3) molecules are excited between the initial ground state 1 and the intermediate state 2. Thereafter, the molecules spontaneously decay from intermediate state 2 to both the final ground state 3 and initial ground state 1. As shown in FIG. 3 of the drawing, if excitation continues, the population in the initial ground state 1 is rapidly depleted leaving all molecules in the final ground state 3, although complete depletion is not essential to this invention.

The fluoresence associated with the excitation at region A is detected by any conventional detector 30 which provides an output signal 32 in accordance therewith. Any suitable lens 34, if necessary, may be utilized with detector 30. Detector 30 feeds output signal 32 into a conventional servo loop 36 which locks the frequency of laser 26 to the center of the line corresponding to the transition between the initial state 1 and the intermediate state 2.

Referring once again to FIG. 1 of the drawing beam 24 at a different frequency than beam 22 intersects molecular beam 18 at region B. Consequently, the beam molecules in region B of molecular beam 18 will be excited from the final ground state 3 to the intermediate state 2 from which they spontaneously decay to the final state 3 and initial state 1. If excitation continues all atoms will be left in the initial ground state 1, however, complete transfer to initial state 1 is not essential to this invention. The fluorescence associated with the spontaneous decay (shown in FIG. 3 of the drawing,) is detected in the B region by means of a conventional detector 38 and its associated lens 40 (if necessary). Detector 38 provides a signal 42 in accordance therewith to feed a conventional servo loop 44 so as to lock laser 28 to the resonant frequency corresponding to the transition between the final state 3 and the intermediate state 2.

Optically aligned with beams 22 and 24 is any conventional frequency difference detector 46 in the form of, for example, a Lithium Niobate or KDP crystal. Detector 46 provides a signal 47 representative of the frequency difference between locked beams 22 and 24. It is this frequency difference in the form of signal 47 which can be utilized as the time and frequency (clock signal) standard or as a signal to stabilize a conventional high precision clock 48 by the addition of a conventional mixer 49 and servo loop 51.

In attaining signal 47, however, it should be noted that it is necessary to detect fluorescence at regions A and B. If no fluorescence is detected at either regions A or B, the frequencies of lasers 26 and 28 would have to be adjusted accordingly until the desired fluorescence is produced.

A problem, however, may result with the embodiment of this invention set forth in FIG. 1 of the drawing. That is, if frequency jitter is present in the output of either laser 26 or laser 28, the output clock signal 48 would be adversely affected. However, this frequency jitter may be cancelled to a degree by frequency offset-locking the two lasers. Alternatively, one laser may be used and a portion of its radiation frequency shifted by means of an acousto-optic, or electro-optic modulator, or by other frequency shifting means. Therefore, in order to eliminate the problem of frequency jitter as well as the need for an optical frequency difference detector, a further embodiment of this invention in the form of laser excited time and frequency standard 50 is described in detail hereinbelow. Since many of the same elements are used in time and frequency standard 50 as with time and frequency standard 10, the identical elements will be similarly identified in both embodiments.

Figure 2:
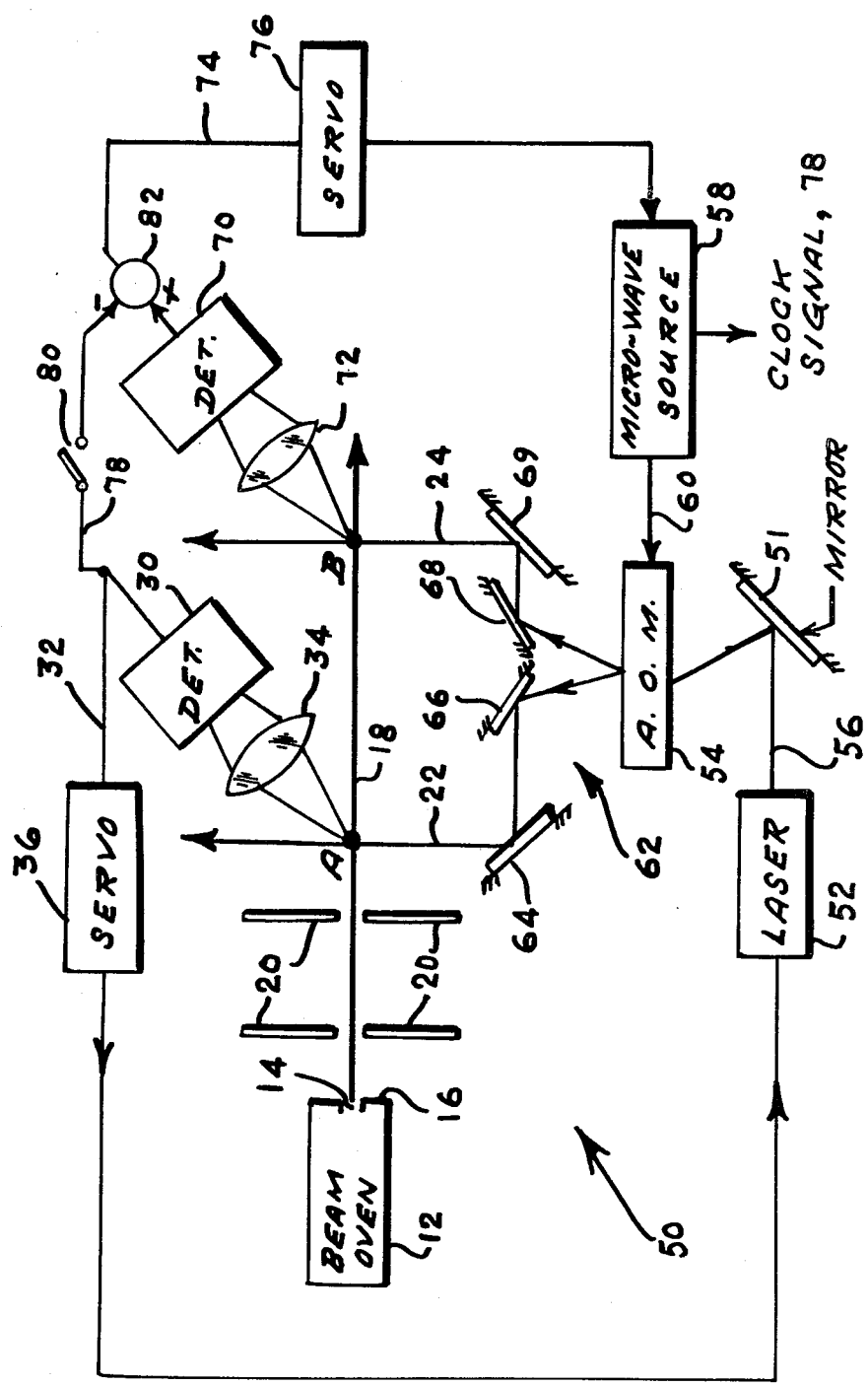
FIG. 2 is a schematic representation of a further embodiment of the laser excited molecular beam time and frequency standard of this invention.

Reference is now made to FIG. 2 of the drawing which depicts in schematic fashion laser excited molecular beam time and frequency standard 50 of this invention. Time and frequency standard 50 of this invention as with time and frequency standard 10 utilizes a conventional molecular beam source 12 such as a beam oven to provide a stream of molecules. The molecules are formed into a molecular beam 18 by means of conventional collimating slits 20.

In the embodiment of this invention shown in FIG. 2 of the drawing, in order to eliminate the effects of laser frequency jitter on the output and the need for a frequency difference detector 46, a single source of coherent electromagnetic radiation in the form of, for example, a compact semi-conductor laser 52 is utilized to produce beams 22 and 24. Therefore, as described in detail hereinbelow, both beams will contain the same jitter and its effects will be cancelled by an appropriate conventional subtraction procedure by the utilization of, for example, a conventional operational amplifier in a manner to be discussed in detail hereinbelow.

In order to provide a detailed explanation of the operation of this embodiment 50 of this invention, it is first necessary to explain the operation of a conventional acousto-optical modulator (A.O.M.) 54 which is optically aligned by means of any conventional mirror 51 (if necessary) with an electromagnetic beam 56 emitted from laser 52. Acousto-optical modulator 54 is conventional and operates in conjunction with any suitable source of electromagnetic power such as, for example, a microwave source 58. The operation thereof is clearly described by T. Tamir, Ed., "Topics in Applied Physics," *Integrated Optics* Vol. 7, Springer-Verlag, New York, 1975, Chapter 4.

Acousto-optical modulator 54 is capable of dividing beam 56 into two portions as well as altering or shifting the frequency of one of the portions of the electromagnetic beam 56. The modulator 54 acts as a moving thick diffraction grating with the modulated light emerging at the Bragg angle. A portion of the electromagnetic beam emerges at the same frequency as beam 56 entering modulator 54 and is represented as beam 22 in FIG. 2 of the drawing. The other portion of the electromagnetic beam 56 emerges from modulator 54 with an altered frequency and is referred to in FIG. 2 as beam 24.

The beam splitting and shifting of the laser frequency is accomplished by providing an input of electromagnetic power 60, for example, in the microwave range, from source of electromagnetic power 58 to acousto-optical modulator 54. The intensity of the frequency shifted portion (beam 24) is dependent upon the microwave input power level to the acousto-optical modulator 54. The amount of the frequency shift is equal to the microwave (acoustical) frequency. In addition, directing optics 62 in the form of any suitable number of conventional directing means, such as mirrors 64, 66, 68 and 69 are utilized to direct beams 22 and 24 in the manner indicated in FIG. 2 of the drawing.

Reference is now made specifically to beam 22 which intersects molecular beam 18 at region A where excitation occurs in the same manner as excitation occurred with respect to time and frequency standard 10. Consequently, a detailed explanation of the excitation at region A is unnecessary. As with the embodiment depicted in FIG. 1, the molecules are excited between the initial ground state 1 and the intermediate state 2. The molecules spontaneously decay to both the final ground state 3 and initial ground state 1. The fluorescence associated with this excitation at region A is detected by any conventional detector 30 which provides an output signal 32. Detector 30 feeds output signal 32 into a conventional servo loop 36 which locks the frequency of laser 52 to the center of the transition between the initial state 1 and intermediate state 2.

The modulated portion 24 of the electromagnetic beam 56 entering acousto-optical modulator 54 which has been shifted in a manner described hereinabove intercepts molecular beam 18 at region B. The beam molecules in region B of molecular beam 18 will be excited from the final state 3 to the intermediate state 2 from which they spontaneously decay to both the final state 3 and initial state 1. If excitation continues all molecules are left in the initial state 1 as depicted in FIG. 3, however, complete transfer is not essential to this invention. The fluorescence associated with the spontaneous decay is detected in the B region by means of a conventional detector 70 and its associated lens 72 (if necessary). Detector 70 provides a signal 74 in accordance therewith to feed a conventional servo loop 76 so as to lock microwave source 58 powering acousto-optical modulator 54 to the transition frequency between initial state 1 and final state 3. That is, locking the frequency of beam 24 to the resonant frequency corresponding to the transition between the final state 3 and initial state 1. The output 78 of microwave source 58 is therefore at a frequency of the transition between the final state 3 and the initial state 1. This constitutes the time and frequency standard (clock signal) produced by the time and frequency standard 50 of this invention.

Again it should be realized, however, that if no fluorescence is detected at either of regions A or B, the frequency of laser 52 and/or microwave source 58, respectively, would have to be adjusted accordingly until the desired fluorescence is produced. In addition, detector 30 and detector 70 may be interconnected by means of line 78 having a conventional switch 80 and a conventional error signal subtraction device such as a conventional operational amplifier 82. By the closing of switch 80, the laser jitter is subtracted from the error signal from detector 70.

Although this invention has been described with reference to particular embodiments and illustrative of a three level molecular system, it will be understood to those skilled in the art that this invention is also capable of a variety of further embodiments and having other molecular or atomic systems within the spirit and scope of the appended claims.

We claim:

1. An optically excited molecular beam time and frequency standard comprising:
   (a) means for producing a molecular beam
   (b) means for producing a first beam of coherent electromagnetic radiation at a first preselected frequency and directing said first beam in a direction intersecting said molecular beam at a first preselected point,
   whereby said first beam intersecting said molecular beam at said first preselected point excites the molecules of said molecular beam from an initial state to an intermediate state from which said molecules fluoresce to a final state,
   (c) first means for detecting said fluorescence emitted from said intermediate state to said final state and producing a signal in accordance therewith,
   (d) means operably connected between said first detecting means and said means for producing said first electromagnetic beam for feeding said signal thereto in order to lock said preselected frequency of said first beam to the resonant frequency corresponding to the transition between said initial state and said intermediate state,
   (e) means for producing a second beam of coherent electromagnetic radiation at a second preselected frequency and directing said second beam in a direction intersecting said molecular beam at a second preselected point,
   whereby said second beam intersecting said molecular beam at said second preselected point excites the molecules in said molecular beam from said final state back to said intermediate state from which said molecules fluoresce to said initial state,
   (f) second means for detecting said fluorescence emitted from said intermediate state to said initial state and producing a signal in accordance therewith,
   (g) means operably connected between said second detecting means and said means for producing said second electromagnetic beam for feeding said signal thereto in order to lock said preselected frequency of said second electromagnetic beam to a resonant frequency corresponding to the transition between said final state and said intermediate state, and
   (h) means optically aligned with said first and second locked electromagnetic beams for detecting a difference in frequency therebetween, said frequency detecting means producing an output signal representative of said frequency difference.

2. An optically excited molecular beam time and frequency standard as as defined in claim 1 wherein said first and said second electromagnetic radiation producing means each being a laser.

3. An optically excited molecular beam time and frequency standard as defined in claim 2 wherein said means for producing said molecular beam comprises a beam oven and at least one beam collimating means.

4. An optically excited molecular beam time and frequency standard comprising:
   (a) means for producing a molecular beam,
   (b) means for producing a beam of coherent electromagnetic radiation at a preselected frequency,
   (c) means in optical alignment with said electromagnetic beam for (1) directing a portion of said electromagnetic beam at said preselected frequency in a direction intersecting said molecular beam at a first preselected point, (2) altering said preselected frequency of the other portion of said electromagnetic beam, and (3) directing said other portion of said electromagnetic beam in another direction intersecting said molecular beam at a second preselected point spaced apart from said first preselected point,
   whereby said portion of said electromagnetic beam intersecting said molecular beam at said first preselected point excites the molecules in said molecular beam from an initial state to an intermediate state from which said molecules fluoresce to a final state,
   (d) first means for detecting said fluorescence emitted from said intermediate state to said final state and producing a signal in accordance therewith,
   (e) means operably connected between said first detecting means and said means for producing said electromagnetic beam for feeding said signal to said means for producing said electromagnetic beam in order to lock said preselected frequency of said electromagnetic beam to the resonant frequency corresponding to the transition between said initial state and said intermediate state,
   whereby said other portion of said electromagnetic beam intersecting said molecular beam at said second preselected point excites the molecules in said molecular beam from said final state back to said intermediate state from which said molecules in said molecular beam fluoresce to said initial state, (f) second means for detecting said fluorescence emitted from said intermediate state to said initial state and producing a signal in accordance therewith, (g) said beam directing and altering means including means for producing coherent electromagnetic power at a preselected frequency, said frequency of said power produced by said power producing means determining said preselected frequency of said other portion of said electromagnetic beam, and (h) means operably connected between said second detecting means and said power producing means for feeding said signal to said power producing means in order to lock said preselected frequency of said electromagnetic power to the transition between said final state and said initial state, whereby said power producing means outputs a signal at the frequency of said locked frequency corresponding to the transition between said final state and said initial state.

5. An optically excited molecular beam time and frequency standard as defined in claim 4 further comprising means interconnecting said first detecting means with said second detecting means for removing any error signals associated with said first detecting means in order to prevent said error signals from being included in said second detector signal.

6. An optically excited molecular beam time and frequency standard as defined in claim 5 wherein said first electromagnetic radiation producing means is a laser.

7. An optically excited molecular beam time and frequency standard as defined in claim 6 wherein said beam directing and altering means further includes an acousto-optical modulator.

8. An optically excited molecular beam time and frequency standard as defined in claim 7 wherein said electromagnetic power producing means is a microwave source.

9. An optically excited molecular beam time and frequency standard as defined in claim 8 wherein said means for providing said molecular beam comprises a beam oven and at least one beam collimating means.

10. An optically excited molecular beam time and frequency standard as defined in claim 9 wherein a first servo loop connects said first detecting means to said laser and a second servo loop connects said second detecting means to said microwave source.

* * * * *